(12) United States Patent
Rodriguez-Jovet

(10) Patent No.: US 9,314,714 B2
(45) Date of Patent: Apr. 19, 2016

(54) GREASE TRAP WITH TURBULENCE BUFFER

(71) Applicant: Felix Juan Rodriguez-Jovet, Ponce, PR (US)

(72) Inventor: Felix Juan Rodriguez-Jovet, Ponce, PR (US)

( * ) Notice: Subject to any disclaimer, the term of this patent is extended or adjusted under 35 U.S.C. 154(b) by 0 days.

(21) Appl. No.: 13/780,452

(22) Filed: Feb. 28, 2013

(65) Prior Publication Data

US 2014/0238925 A1    Aug. 28, 2014

(51) Int. Cl.
| | |
|---|---|
| *B01D 21/26* | (2006.01) |
| *B01D 37/00* | (2006.01) |
| *B01D 33/15* | (2006.01) |
| *B01D 17/02* | (2006.01) |
| *C02F 1/38* | (2006.01) |
| *B01D 17/04* | (2006.01) |
| *C02F 1/34* | (2006.01) |

(52) U.S. Cl.
CPC ........ *B01D 17/0211* (2013.01); *B01D 17/0217* (2013.01); *B01D 17/041* (2013.01); *B01D 17/047* (2013.01); *C02F 1/34* (2013.01); *C02F 1/38* (2013.01); *C02F 2201/002* (2013.01); *C02F 2301/028* (2013.01)

(58) Field of Classification Search
CPC .................... B01D 17/0211; B01D 2221/06
See application file for complete search history.

(56) References Cited

U.S. PATENT DOCUMENTS

| | | | | |
|---|---|---|---|---|
| 4,011,802 A | * | 3/1977 | Molitor et al. | 126/299 R |
| 4,026,799 A | * | 5/1977 | Hildreth | 210/801 |
| 4,173,532 A | * | 11/1979 | Keoteklian | 210/631 |
| 4,216,085 A | * | 8/1980 | Chittenden | 210/703 |
| 4,324,657 A | * | 4/1982 | Garrett | 210/197 |
| 4,451,979 A | * | 6/1984 | Schuster | 29/824 |
| 4,526,687 A | * | 7/1985 | Nugent | 210/202 |
| 4,850,704 A | * | 7/1989 | Zimmerly et al. | 366/263 |
| 5,004,534 A | * | 4/1991 | Buzzelli | 210/164 |

* cited by examiner

*Primary Examiner* — Nam Nguyen
*Assistant Examiner* — Richard Gurtowski
(74) *Attorney, Agent, or Firm* — Eugenio J. Torres-Oyola; Victor Rodriguez-Reyes; Ferraiuoli LLC

(57) ABSTRACT

An apparatus and method to separate grease and solids from wastewater before reaching the sewers using a grease trap, wherein said grease trap comprises a turbulence buffer and a plurality of chambers which efficiently trap solid particles from the water waste in other to make easier the compliance with regulating agencies.

5 Claims, 9 Drawing Sheets

GREASE TRAP WITH TURBULENCE BUFFER

STATEMENT REGARDING FEDERALLY SPONSORED RESEARCH AND DEVELOPMENT

N/A

RELATED APPLICATIONS

N/A.

BACKGROUND OF THE INVENTION

1. Field of the Invention

The invention is related to grease traps, more particularly to an apparatus and method to separate grease and solids from wastewater before reaching the sewers.

2. Discussion of the Background

Grease traps, also known in the art as grease interceptors, and grease recovery devices are mechanisms intended to capture greases and solids before they enter the sanitary system. Grease traps are usually constructed of concrete, fiberglass or steel having high grease and solid storage capacities for high flow applications. Generally, said grease traps are used in restaurant and foodservice kitchens wherein a lot of waste grease including fats, oils, grease and other residues are present. The waste material is normally known as "fats, oils, and grease" (FOG). Grease traps tend to remove all the FOG from the wastewater before it reaches the sewers in order to comply with government regulations.

As mentioned the main purpose of the grease traps is to retain oil, grease and other solids well trapped, allowing cleaner wastewater to flow onto the public sewer. However, sometimes residues or waste materials are not completely contained inside of said traps and end up reaching public sewer facilities without complying with parameters regulated by local authorities. For example, U.S. Pat. No. 5,993,646 to Powers discloses a grease trap having an inlet member, a discharge member, plurality inner walls defining chambers within, and a relief member for flushing accumulated waste matter. In general the fluid flows through to a chamber including an inlet chamber, a preliminary chamber, an outlet chamber, a discharge chamber, and a reservoir chamber. A gauge member adjacent to the reservoir chamber is adapted to view waste accumulation which, when necessary, is flushed through the relief member via the reservoir chamber. However even when the grease trap has a system to flush out the waste material the residue that move on the top of the chamber reaches the sewers due to the impact effect of liquids received from the sinks, or even worse, from dishwasher machines, creating turbulence in the first chamber, pushing solids away towards the outlet.

Therefore there is a need for a grease trap capable to contain effectively the residues flowing through the waste water.

SUMMARY OF THE INVENTION

The present invention overcomes the disadvantages of the Prior Art providing a grease trap with a detachable residue interceptors comprising at least a removable mesh fixed to a residue trap opening using several attachments, wherein said residue interceptors efficiently reduce turbulence and trap solid particles from the wastewater, making it easier to comply with local agency regulations.

Another object of the invention is to provide a detachable residue interceptor which can be easily removed, cleaned, washed and reused, or alternatively dropped in the garbage and replaced with a new mesh.

Another object of the invention is to reduce bad odors at the grease trap.

Another object of the invention is to simplify and reduce the cleaning time in such way that the personnel in charge of cleaning has complete access to make a better interior cleaning and make sure that, even when pumped out, less residues are left behind.

Another object of the invention is to complete and control immediate turbulence in the first chamber allowing the greases to get organized in the very first chamber while clean water flows ahead.

Another object of the invention is to provide a flow second path to avoid clogging of the trap when all meshes get full.

Another object of the invention is to provide an inner wall to avoid clogging due to the meshes interfering with the waste water flow.

Another object of the invention is to provide an easy mesh assembling at the residue trap.

Yet another object of the invention is to control the turbulence of the wastewater by creating a vortex in a first chamber of the grease trap, wherein said vortex functions as a filter.

The invention itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings which are incorporated herein constitute part of the specifications and illustrate the preferred embodiment of the invention.

DESCRIPTION OF THE PREFERRED EMBODIMENTS

The present first embodiment of the grease trap comprises several parts, made from different materials, wherein said parts are assembled to provide a receptacle to regulate flow and clean wastewater before the waste water is deposited into city sewers. For example, materials including but not limited to polypropylene (white, cleat) panels, aluminum angles or frames, rubber joints with adhesive, stainless steel locknuts, screws and nuts, stainless steel hinges with bearings, butterfly nuts and dowel screws, galvanized knobs, PVC-SCH40 pipes, fittings and tubular meshes of different materials, such as cotton or poly-cotton fiber, are assembled together to construct the present grease trap 1.

Figure 1:
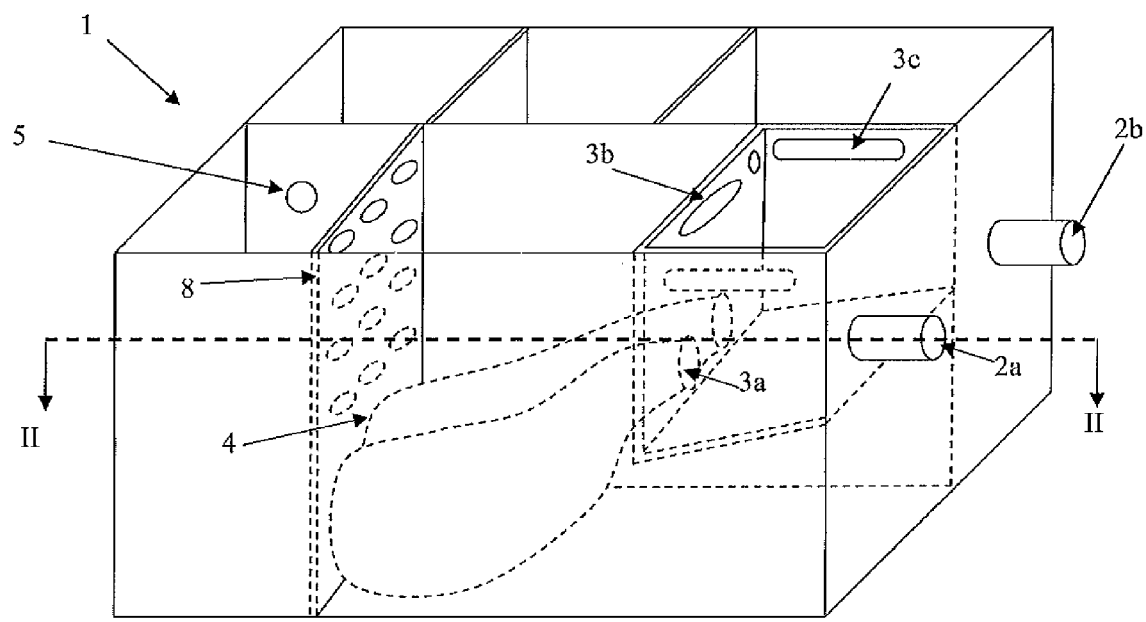
FIG. 1 is an isometric view of the first embodiment of the grease trap.

FIG. 1 shows the assembly of a grease trap 1 using said materials, wherein said grease trap 1 comprises several chambers I-VI, an inlet 2a providing a path for the waste water pipes from the restaurant or food service kitchen to be treated at the grease trap 1, an outlet 2b providing a path for the treated waste water to reach the sewer pipes, several baffles forming the chambers I-VI and a residual trap 3.

The aluminum frame covering some polypropylene panels are used to create outer walls for the grease trap 1. Inside said outer walls several baffles are assembled to create the chambers I-VI. As shown in FIG. 1, the baffles arrangement creates a first chamber I which is the first chamber to get in contact with the waste water. As illustrated, the first chamber's dimensions are bigger than the other chambers II-VI.

Figure 2:
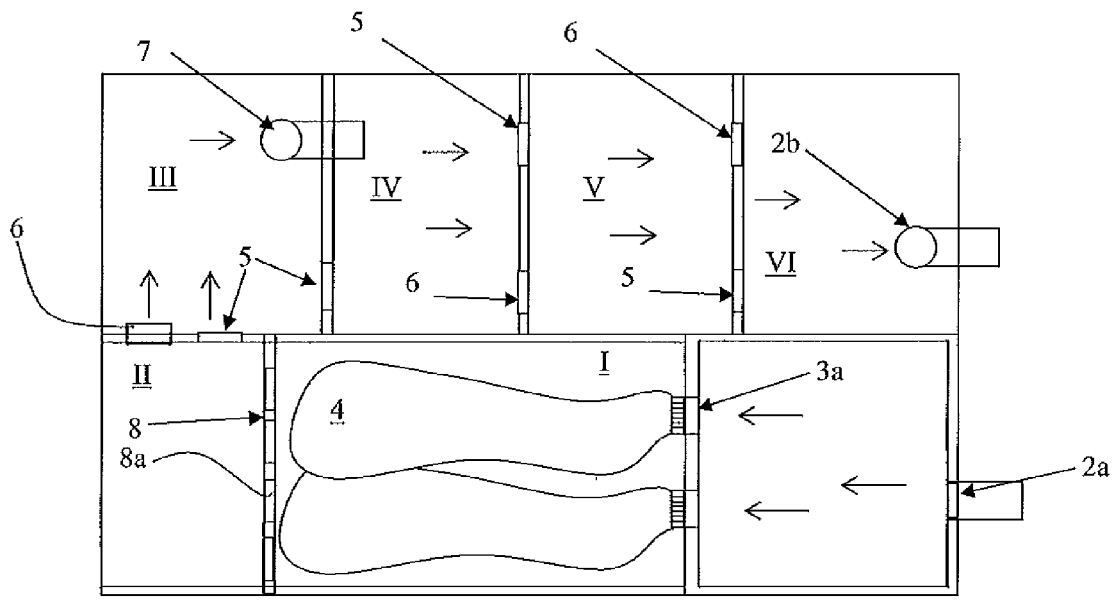
FIG. 2 is a top view of the first embodiment of the grease trap.

During the water waste treating process the wastewater accesses the grease trap 1 through an opening 2a formed at the first chamber I of the grease trap 1. Most of the residues at the waste water are removed at the first chamber I by means of a turbulence buffer or detachable residue trap 3. The detachable residue trap 3 is fixed inside said first chamber I, wherein the opening 2a is aligned and physically connected to the intake of the removable residue trap 3 as shown in FIG. 2. In the instance case, the inner wall of chamber I is shaped to hold the residue trap 3 in position in such way that the flow of wastewater interacts with the residue trap 3 instead of directly contacting the first chamber I. The residue trap 3 serves as a buffer for the waste water turbulence before the waste water moves through the chambers I-VI in a particular order creating a path wherein each chamber help with the treating process of said waste water.

Figure 3:
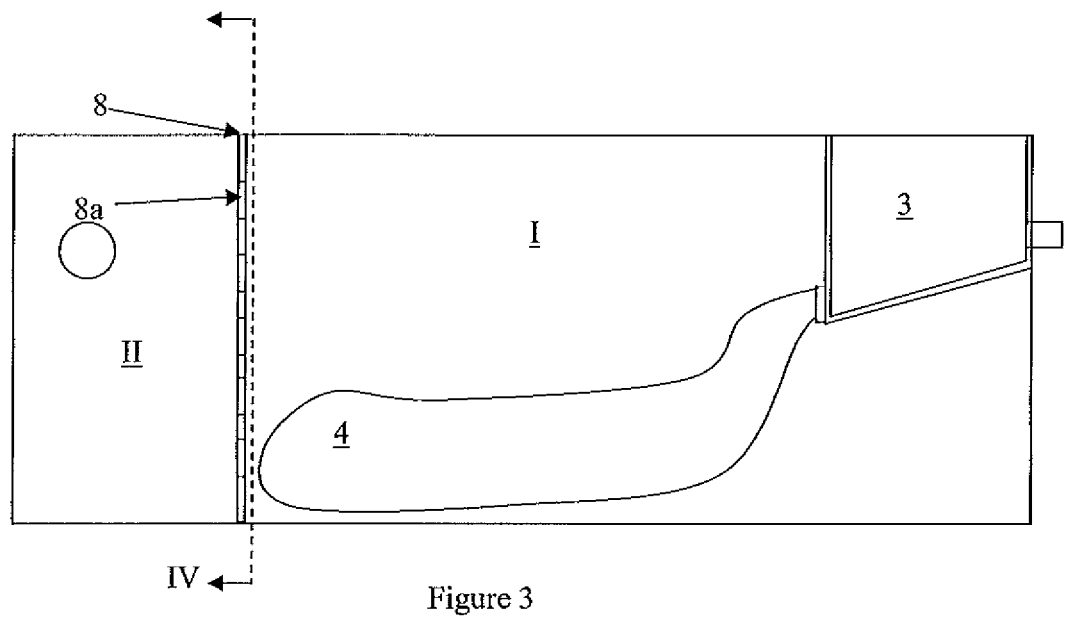
FIG. 3 is a side view of the first embodiment of the grease trap.
Figure 4:
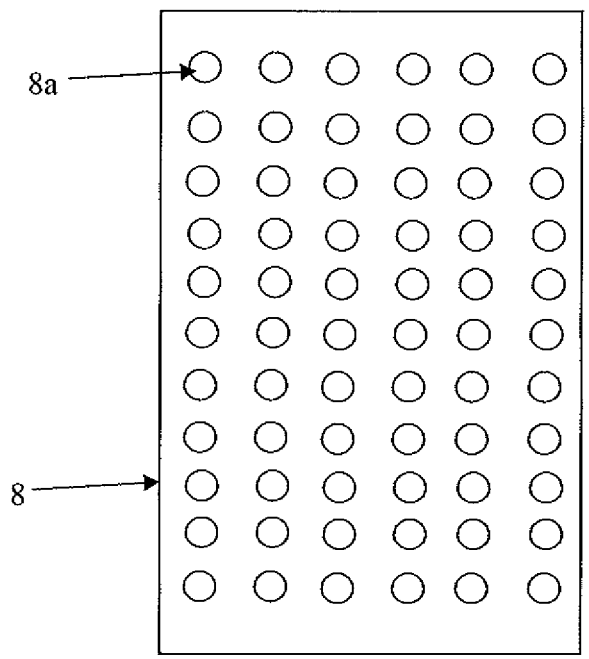
FIG. 4 is an exploded and front view of the inner wall of the first embodiment of the grease trap from FIG. 3.

As mentioned before and as shown in FIG. 3, the first chamber I is configured to control the displacement of the detachable residue trap 3. The dimensions of that first chamber are restricted by an inner wall baffle 8 which serves as a wall between chamber I and chamber II. The wall 8 is positioned at a point wherein enough space is provided for the extension of a mesh 4 connected to the residue trap 3. The inner wall 8, as shown in FIG. 4, comprises several openings 8a. The openings 8a avoid the clogging due to the mesh 4 while provides different path for the waste water flow to reach the subsequent chamber. The wall 8 is removable for cleaning purposes wherein said chamber I is configured to fix and support said wall 8 in position.

Figure 5:
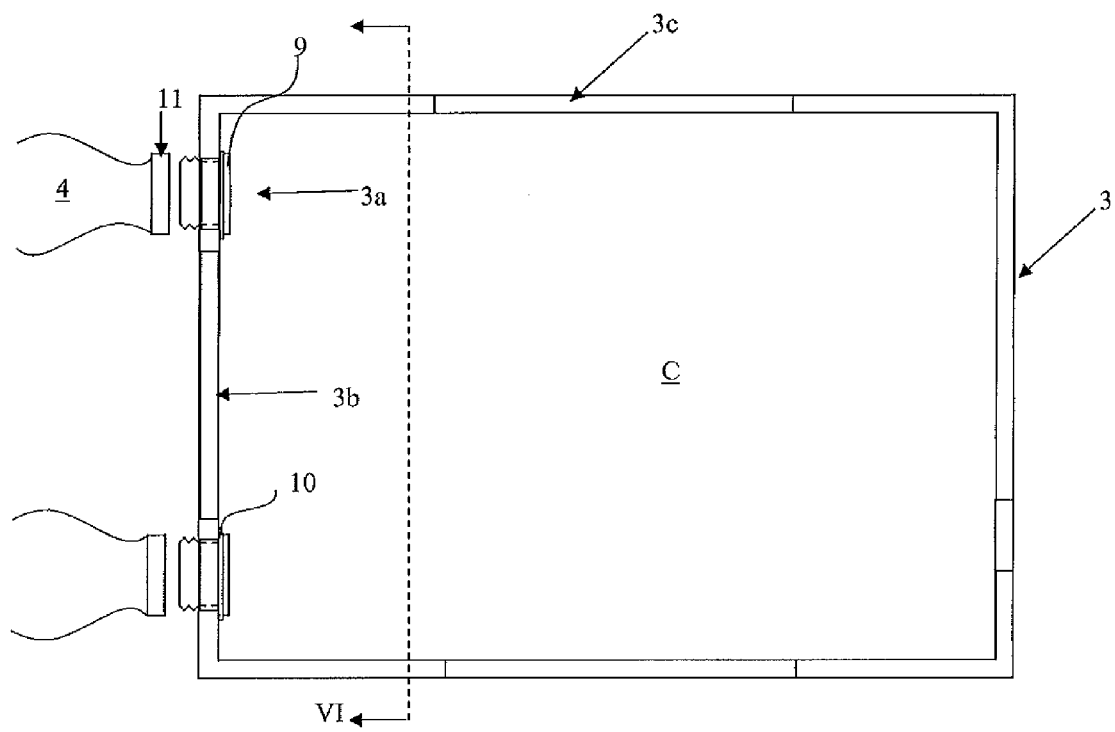
FIG. 5 is a top view of the residue trap.
Figure 6:
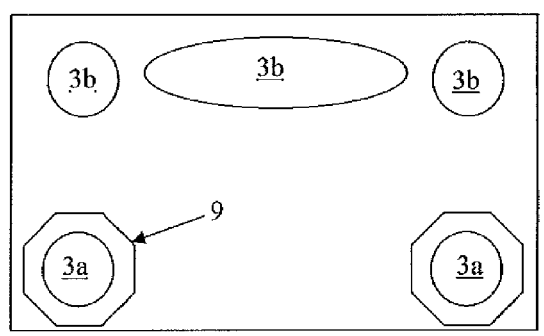
FIG. 6 is an exploded view of the residue trap segment from FIG. 5.

The residue trap 3, as shown in FIG. 5, comprises a receptacle device which includes a boxlike compartment or drawer structure C fixed inside the grease trap 1, but more specifically inside the first chamber I wherein said drawer structure comprises at least an inlet for a residue trap, at least one opening or outtake 3a connected through an adapter 9, 11 to a bag or mesh 4, at least an overflow escape 3b and handles 3c. The residue trap 3 is provided with a deeper bottom on the side of the openings 3a were the meshes 4 are to be connected in order to control turbulence while assisting the flow of wastewater. The adapter can be formed integrally with the residue trap 3 or separate. The present invention provides an adapter 9, 11 comprising a mesh's holder 9 having a hollow body with a flange at a distal end and a spiral ridge or thread at the other end. The flange is configured to be fixed inside the residue trap 3 while the pipe extends through the residue opening 3a. The flange is shaped to have a surface that in combination with the residue trap's 3 surface avoiding the rotation of the hollow body after assembled. For example, a cylindrical hollow body with a hexagonal flange is provided in FIG. 6. The thread end is adapted to receive a mesh's fixing portion such as a nut 11.

Figure 7:
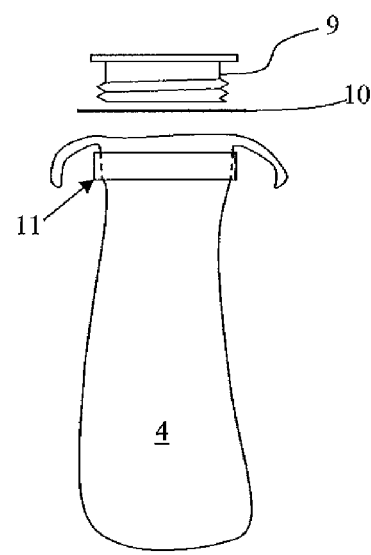
FIG. 7 shows the mesh parts for assembly at the residue trap.

The mesh's fixing portion 11 firmly holds the mesh 4 to the residue trap 3 using hollow body threads and said a mesh's fixing portion 11. FIG. 7 shows the mesh 4 assembly, the residue trap is not presented in order to clearly disclose said assembly. The hollow body 9 is first inserted through openings 3a wherein the flange is positioned inside the residue trap 3. A gasket or seal 10 is provided between the hollow body 9 flange and the residue trap 3. The hollow body 9 is positioned inside the opening 3a in such way that at least the hollow body's thread extend away from the opening 3a. The mesh fixing portion 11 is connected and/or fixed to the hollow body 9. However before the connection, said mesh 4 is inserted through the center of the mesh's fixing portion 11 until a portion of the mesh 4 is folded back leaving a short piece over the mesh's fixing portion outer surface. Then the mesh's fixing portion 11 is fixed to hollow body 9 using the thread which simultaneously fixes the mesh 4. Usually the connection is the same for all meshes 4.

Figure 8:
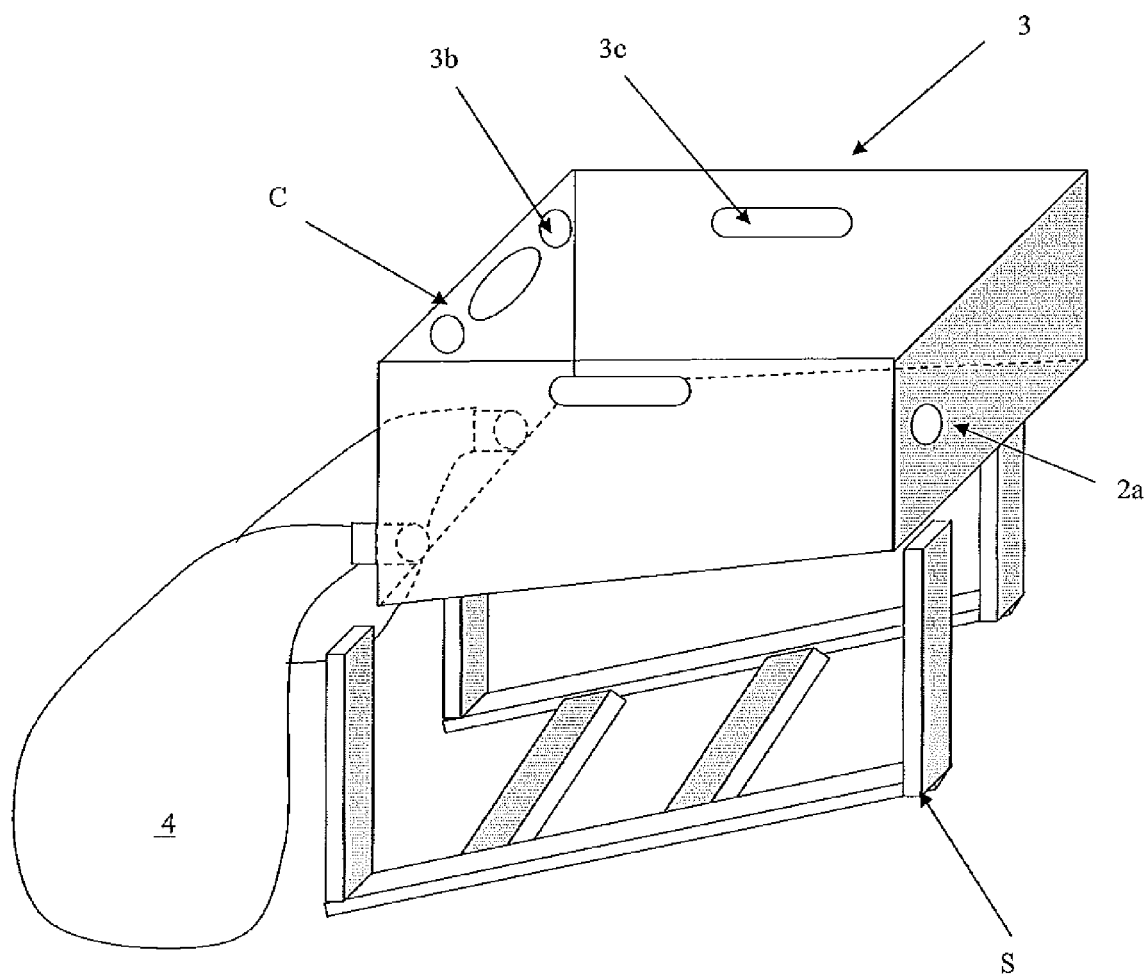
FIG. 8 is an isometric view of the residue trap.

FIG. 8 provides an isometric view of the residue trap 3. A support structure S which can be provided at the grease trap 1 inside the first chamber I controls the displacement of said residue trap 3 making the detachment of the residual trap 1 easier from the first chamber I, if needed, for cleaning.

During the waste water treating process the waste water carries grease, oil, vegetables and a variety of other solid particles from the dish washing process and floor drains connected to the first chamber I of the grease trap 1. The flow enters with turbulence due to the impact of liquids received from the inlet 2a. The residue trap 3 substantially controls the turbulence avoiding the waste water to push solids away towards the outlet 2b. When the waste water reaches the drawer 3 it is directed to the residue trap outtake wherein the meshes 4 are connected. Letting the water pass through, the mesh 4 serves as a filter wherein solid particles are trapped inside the mesh 4, making it easier to comply with parameters regulated by local authorities. Also, since fewer solids remain at the bottom of the wastewater, the bad odors due to the decomposition are avoided or reduced.

As mentioned before, the residue trap 3 is provided with overflow escapes 3b. The main purpose of the overflow escapes is to continue with the wastewater treatment even if clogging occurs at the residue outtake. Further, a mechanical or electronic alert can be introduced in such way that the user will know if clogging due to overloaded meshes are taking place.

When the meshes 4 are packed or needed to be removed as part of the maintenance of the grease trap, the residue trap 3 is provided with handles that helps user to remove the residue trap 3.

Next, the waste water moves toward a second chamber II. As mentioned the grease trap 1 is provided with a removable inner wall 8 with perforations 8a avoiding clogging. The purpose of the inner wall 8 is to keep the end of the mesh 4 away from the transfers 6, usually consisting of PVC piping or a perforation at the baffle, in such way that the grease trap 1 will continue working, chamber after chamber, until reaching its outlet. Further, some baffles are provided with overflow perforation 5 to guarantee the waste water movement through chambers II-VI in case of clogging at the transfer 6, 7. Chambers' walls including P.V.C. piping transfers 6, 7 and/or perforations are designed to provide an effective path that that contributes with the waste water treatment allowing the treating of the waste water.

The assembly of all these parts, including the residue trap 3, the frames, pipes and other materials can be performed in several ways. However, in the instance case the selected assembly includes picking the materials to be used as mentioned before. The first step will be to cut the body parts, such as lid, walls, baffles, bottom, mesh, drawer and others usually made with polypropylene material. Next, all parts are put together using plastic welding process, producing a well built monolithic unit, very strong and extremely durable. It is important to weld the body and baffles together with the exception of detachable baffles.

The PVC inlet 2a, the outlet 2b, other fittings with its corresponding special gaskets and the intermediate transfer pipes are installed inside the body. Further, an aluminum frame comprising thick aluminum angles is installed around the circumference and on top of the grease trap transversal parts. Stainless Steel screws and locknuts are used for its assembling. The upper surface of the framing comprises a self adhesive sponge rubber joint that provides the appropriate seal for the grease trap 1 when closed. The good adhesion of this joint is very important. Also, since polypropylene surface does not have any adherence at all, excellent results are obtained with the adhesion of the foam joint directly to the aluminum frame.

Simultaneously with the above mentioned body assembly, the drawer 3 is prepared. As mentioned before, the drawer structure 3 should show a deeper bottom surface at the side of the openings 3a where the meshes 4 are connected. It may have two or more adapters to connect a mesh, one or two inlets, and an overflow fixture 3b. The mesh 4 is connected using the adapter as mentioned before. After the residue trap is assembled it is installed inside the first chamber II.

Next, for the lid's installation a polypropylene panel is covered with an aluminum sheet, for example Diamond Head mill finish aluminum sheet, in such way that the aluminum faces the top. Fixing means such as screws and locknuts are used in order to attach the lid's polypropylene panel and the aluminum sheet together. Finally, the apparatus is framed with aluminum angles.

Even when there are several ways to install and secure the lid to the grease trap body the present invention uses two different ways. The first one is directed to spaces with little clearance between the sink and the trap's lid. In this case it is preferable to use the dowel screws with butterfly nuts system. The second is directed to model with more space in which is preferable to use stainless steel hinges with bearings. However, the butterfly type is also an option.

Figure 9:
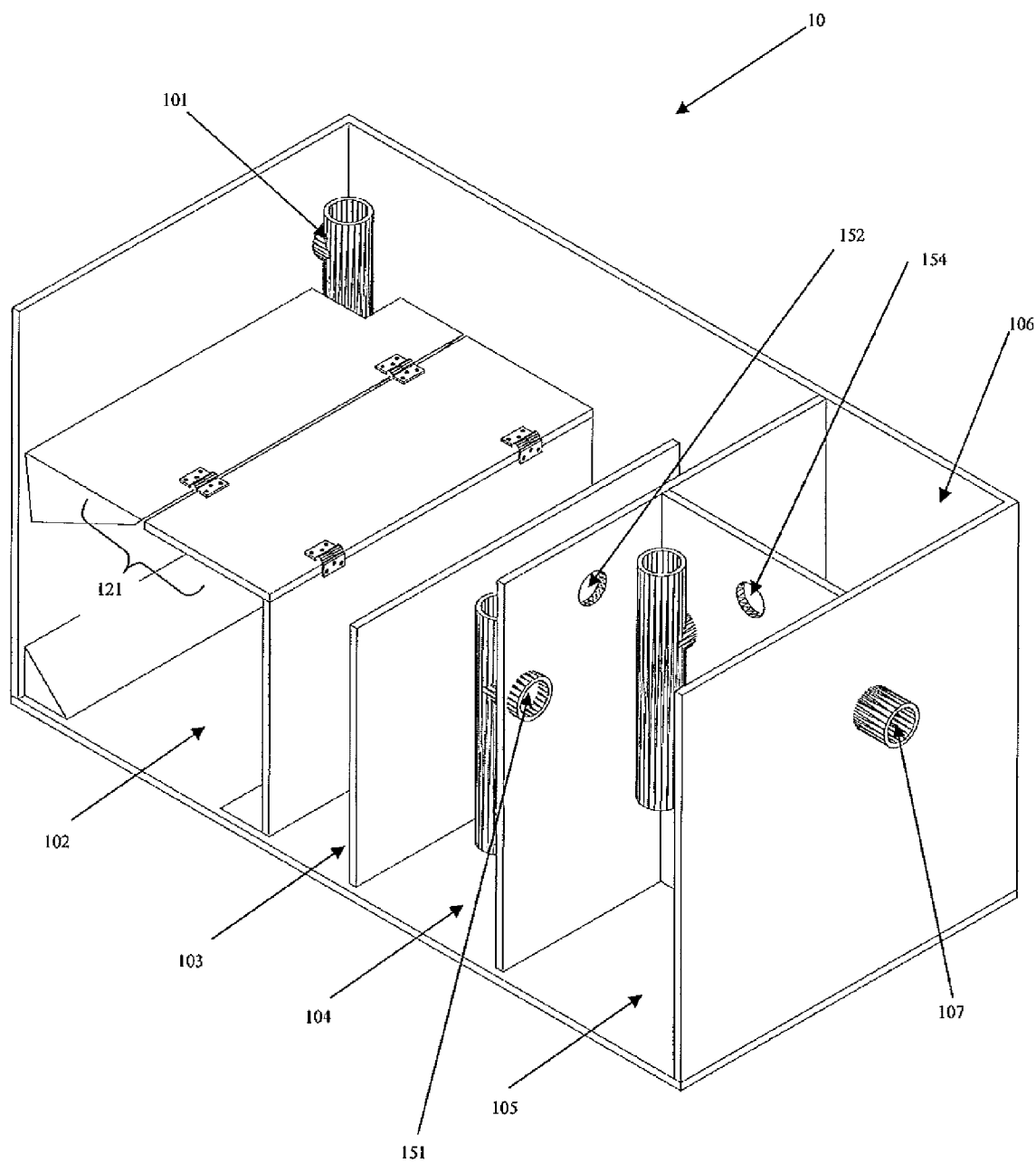
FIG. 9 is an isometric view of the second embodiment of the grease trap.

FIG. 9 shows an isometric view of a second embodiment of the invention. The present second embodiment of the grease trap 10 comprises several parts, made from different materials, wherein said parts are assembled to provide a receptacle to regulate flow and clean wastewater before the waste water is deposited into city sewers. For example, materials including but not limited to polypropylene (white, clear) panels, aluminum angles or frames, rubber joint with adhesive, stainless steel locknuts, screws and nuts, stainless steel hinges with bearings, butterfly nuts and dowel screws, galvanized knobs, PVC-SCH40 pipes and fittings are assembled together to construct the present grease trap 10.

The grease trap 10 comprises a housing, such as a rectangular case comprising an inlet 101, a first chamber 100, a turbulence buffer 121, a plurality of conduct fluid devices TS, a plurality of baffles 117, 118, 119, 120, wherein said plurality of baffles are arranged inside said rectangular case to form said first chamber 100 comprising a first sub-chamber 102, a second sub-chamber 103 and a third sub-chamber 104. Further the plurality of baffles creates a second chamber 105 and a third chamber 106 comprising an outlet 107, and wherein said chambers comprises baffles with openings as waste water paths, between chambers 100, 105, 106 wherein said conduct fluid device TS are attached to said baffle openings.

Figure 10:
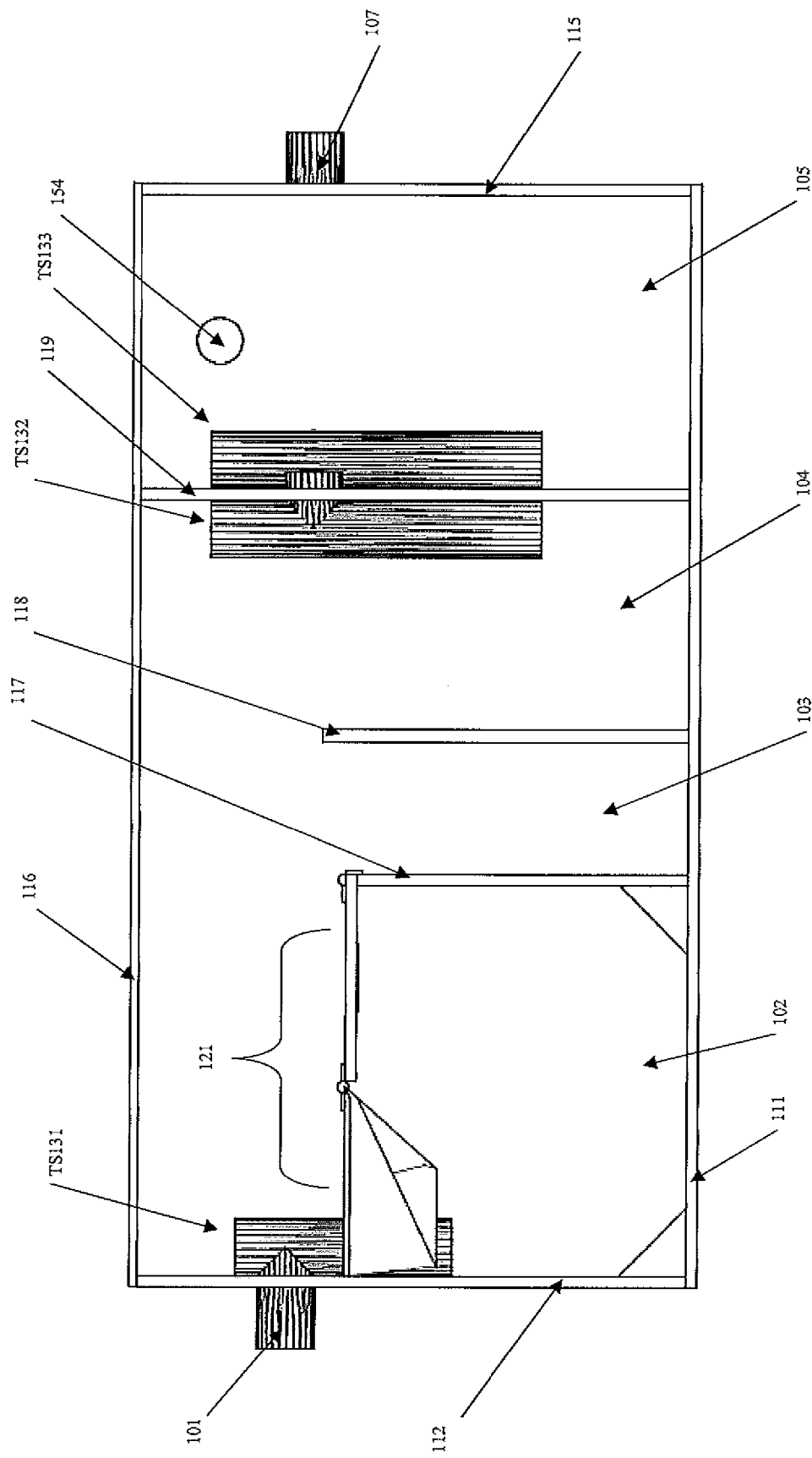
FIG. 10 is a front cross-sectional view of the second embodiment of the grease trap.
Figure 11:
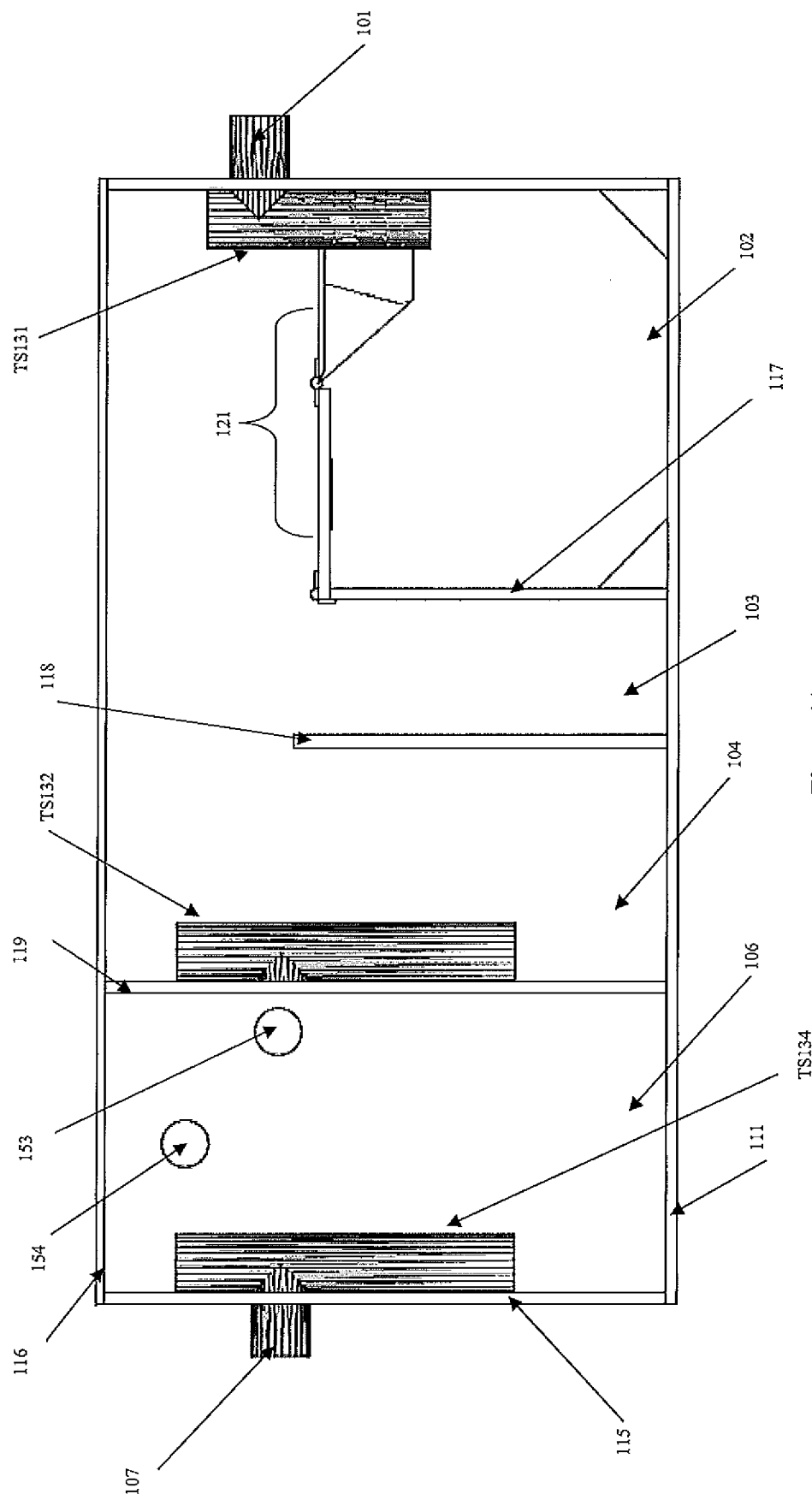
FIG. 11 is a back cross-sectional view of the second embodiment of the grease trap.
Figure 12:
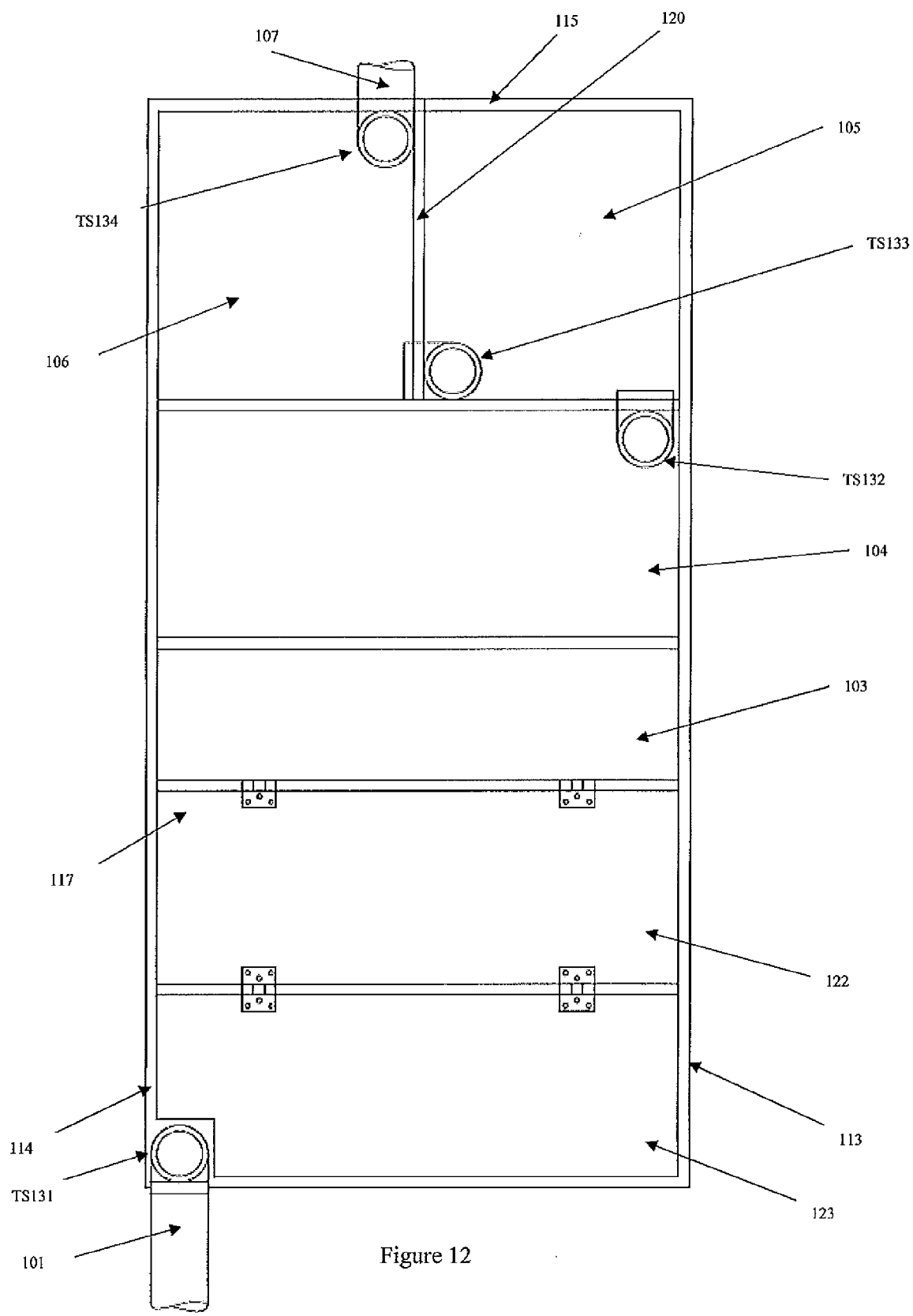
FIG. 12 is a detailed view of a cylindrical tube T-structure.

FIG. 10 shows a side view of the grease trap 10 from the front and FIG. 11 shows a side view of the grease trap 10 from the back. FIG. 12 is a top view of the grease trap 10. The grease trap 10 comprises a rectangular case with a floor 111, a first end wall 112, a first lateral wall 113, a second lateral wall 114, a second end wall 115 and a top 116. Further, the grease trap 10 is divided into chambers by a number of baffles, each baffle comprising a rectangular sheet that comes into contact with the inner surface of the floor 111 and extends vertically. The waste water enters through the inlet 101 and flows through the chambers 100, 105, 106 in sequential order.

Figure 13:
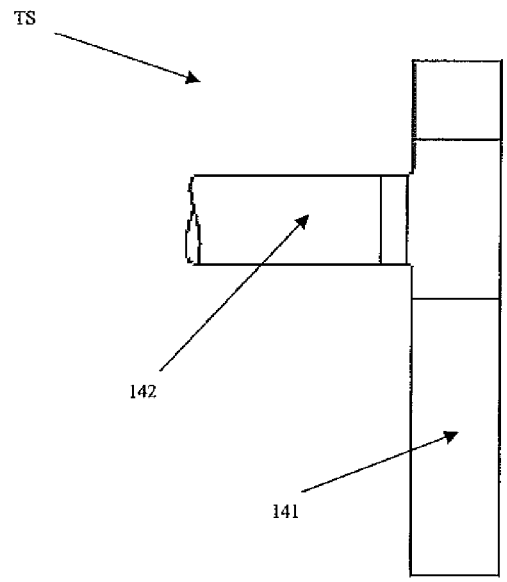
FIG. 13 is a detailed front cross-sectional view of the first chamber of the second embodiment of the grease trap.

FIG. 13 shows a side view of the fluid conduct device, such as a cylindrical tube T-structure TS. The cylindrical tube T-structures TS is incorporate into several openings and outlet of the present invention in order to guide the flow of waste water between chambers. Each cylindrical tube T-structure comprises a vertical tube 141 perpendicularly connected to a horizontal tube 142. The vertical tube 141 is open at both ends and the horizontal tube 142 serves as an opening in the vertical tube 141 body between said open ends. It is important to understand that the fluid control device TS can have different shapes, such as a rectangular shape, wherein said rectangular shape is open at both ends and at least a opening is provided through the conduct fluid device TS body. Further the conduct fluid device TS can be made integrally with the baffles for a faster assembling.

The first end wall 112 comprises an opening such as an inlet 101 serving as an entrance for the waste water toward the grease trap 10. A first cylindrical tube T-structure TS131 is attached to said first end wall 112 in the interior of the inlet 101 near the top 116 of the grease trap 10. Waste water flows into the grease trap 10 through the inlet 101 and through the first cylindrical tube T-structure TS131 into the first chamber 100, more particularly the first sub-chamber 102.

Figure 14:
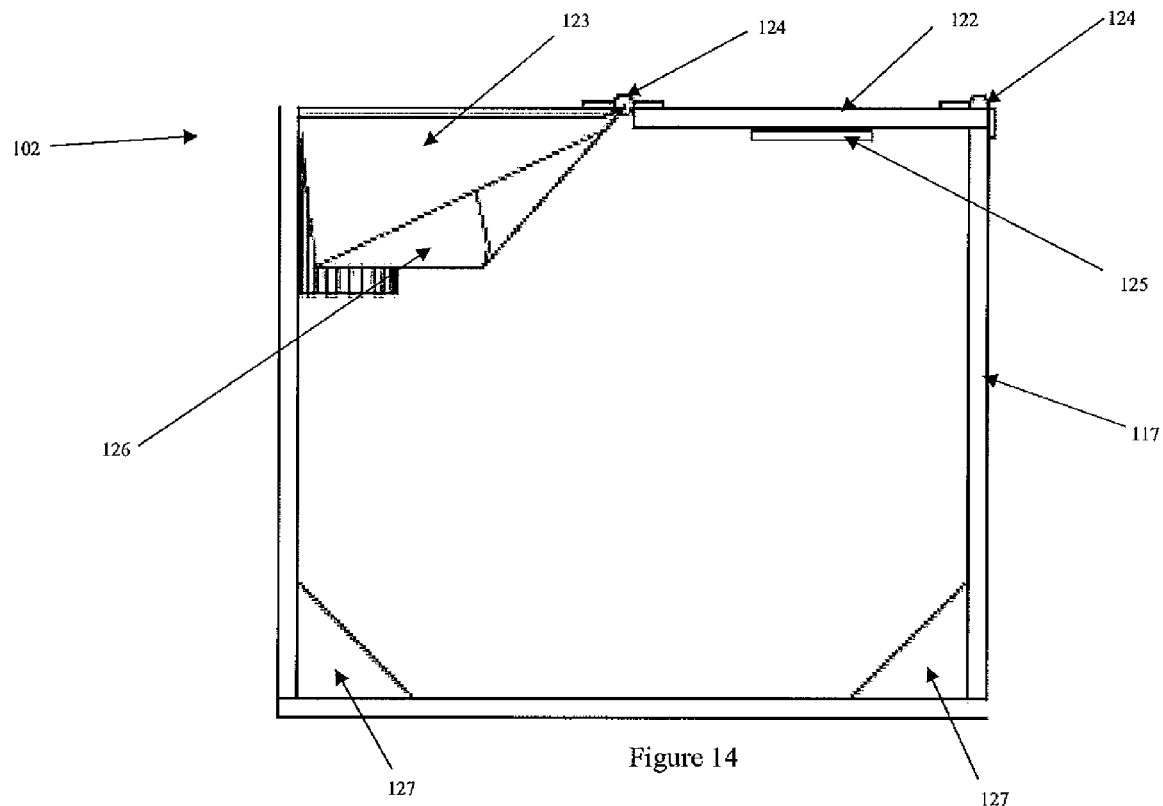
FIG. 14 is a top view of the second embodiment of the grease trap.

The first sub-chamber 102 is comprised within the space created by the floor 111, the first end wall 112, the first lateral wall 113, the second lateral wall 114 and the first baffle 117. The first baffle 117 extends from the first lateral wall 113 to the second lateral wall 114, parallel to the first end wall 112 and second end wall 115. The first baffle 117 reaches the floor 111, but does not reach the top 116. The first chamber 102 also comprises a turbulence buffer 121. FIG. 14 shows a detail of the side view of the first sub-chamber 102.

The turbulence buffer 121 comprises a first movable section 122, a second movable section 123, influent flow guides 127 and fixing means to assemble the device avoiding unwanted movement. The first movable section 122 and the second movable section 123 are mechanically attached and substantially cover the top part of the first sub-chamber 102.

The first movable section 122 comprises a turbulence promoting piece such as a rectangular sheet mechanically connected to the first baffle 117 by fixing means such as hinges 124. The first movable section 122 is attached to the first baffle 117, and extends from the first lateral wall 113 to the second lateral wall 114. The area of the first movable section 122 covers a section of the upper area of the first sub-chamber 102.

The first movable section 122 rests upon the first "L" stopper 125 and second "L" stopper 125, fanning a ninety degree angle with the first baffle 117, partially covering a section of first sub-chamber 102. The first and second "L" stoppers 125 each comprise a piece that is fixed to a flat wall and provides a thin upper surface for a separate piece to rest upon. The first "L" stopper 125 is fixed to the first lateral wall 113 at the height of the top of the first baffle 117 and a second "L" stopper 125 is fixed to the second lateral wall 114 the height of the top of the first baffle 117.

The second movable section 123 is attached to the first moveable section 122 by a fixing means such as hinges 124 and extends from the first lateral wall 113 to the second lateral wall 114. The second movable section 123 comprises a section of material which is interrupted at the corner between the first end wall 112 and the second lateral wall 114 in order to allow the first cylindrical T-structure TS131 to enter into the first sub-chamber 102.

The inferior side of the second movable section 123 of the turbulence buffer 121 and the corners between the first end wall 112 and the floor 111 and between the first baffle 117 and the floor 111 are equipped with influent flow guides 127. Each influent flow guide 127 comprises a wedge that eliminates the aggressive angles formed at each corner. Each influent flow guide 127 extends from the first lateral wall 113 to the second lateral wall 114. Waste water flows into the first chamber 102 as turbulent flow. The turbulence buffer 121 and the influent flow guides 127 drive the flow into a vortex F.

The second sub-chamber 103 comprises the space created between the floor 111, the first baffle 117, the first lateral wall 113, the second lateral wall 114 and the second baffle 118. The second baffle 118 extends from the first lateral wall 113 to the second lateral wall 114, parallel to the first end wall 112, the second end wall 115 and the first baffle 117. The second baffle 118 reaches the floor 111, but does not reach the top 116.

The third sub-chamber 104 comprises the space between the floor 111, the second baffle 118, the first lateral wall 113, the second lateral wall 114 and the third baffle 119. The third baffle 119 extends from the first lateral wall 113 to the second lateral wall 114 in parallel with the first end wall 112 and second end wall 115, and from the floor 111 to the top 116 of the grease trap 10, and comprises a first opening 151 and a second opening 152 located near the top 116. The third sub-chamber 104 also comprises a second cylindrical tube T-structure TS132, similar to the first cylindrical tube T-structure TS131. The second cylindrical tube T-structure TS132 comprises a vertical tube 141 perpendicularly connected to a horizontal tube 142 that enters through the first vent 151 of the third baffle 119. The vertical tube has a first open end at the bottom and a second open end at the top, The second opening 152 of the third baffle 119 is needed for ventilation.

The second chamber 105 comprises the space between the floor 111, the first lateral side 113, the third baffle 119, the fourth baffle 120 and the second end wall 115. The fourth baffle 120 extends from the third baffle 119 to the second end wall 115, in parallel with the first lateral wall 113 and second lateral wall 114, and comprises a third vent 153 and a fourth vent 154. The third opening 153 and fourth vent 154 each comprise an aperture such as a circular hole. The second chamber 105 also comprises a third cylindrical tube T-structure TS133, similar to the first cylindrical tube T-structure TS131 and the second cylindrical tube T-structure TS132. The third cylindrical tube T-structure 133 comprises a vertical tube 141 perpendicularly connected to a horizontal tube 142 that enters through the third opening 153 of the fourth baffle 120. The vertical tube has a first open end at the bottom and a second open end at the top. The fourth opening 154 of the fourth baffle 120 is needed for ventilation.

The third chamber 106 comprises the space between the floor 111, the third baffle 119, the fourth baffle 120, the second lateral wall 114 and the second end wall 115. The third chamber 106 also comprises a fourth cylindrical tube T-structure134, similar to the first cylindrical tube T-structure 131. The fourth cylindrical tube T-structure 134 comprises a vertical tube perpendicularly connected to a horizontal tube that exits through the second end wall 115. The vertical tube has a first open end at the bottom and a second open end at the top.

As mentioned before, the first cylindrical T-structure TS131 discharges waste water into the first sub-chamber 102. The inlet flow guides 127 and the shape of the second movable section 123 of the cover 121 drives the water to flow in a circular movement, creating turbulence within the first sub-chamber 102. The heavier objects found within the waste water is drawn towards the center of the turbulence. Cleaner, less dense water overflows from the first sub-chamber 102 and continues flowing to the subsequent sub-chambers 103, 104 and chambers 105, 106.

As water overflows from the first sub-chamber 102, it flows into the second sub-chamber 103. When water level reaches the top of the second sub-chamber 103, water overflows from the second sub-chamber 103 into the third sub-chamber 104. Dense and heavy objects and fluids remain at the bottom of the second sub-chamber 103 by gravity.

Water flows into the third sub-chamber 104 from the second sub-chamber 103. It is expected that most of the solid objects were removed from the water in the first sub-chamber 102 and second chamber 103 mostly because of the vortex action created at the first sub-chamber 102. Grease and oils are generally less dense than water, and therefore accumulate in the upper layers of the fluid in the third sub-chamber 104. The vertical tube of the second cylindrical tube T-structure 132 extends towards the bottom of the grease trap 10 without reaching the floor 111. Water enters the second cylindrical tube T-structure 132 through the bottom of the vertical tube and rises as water enters the third sub-chamber 104. When the water within the second cylindrical tube T-structure 132 reaches the level of the horizontal tube, the water flows through the horizontal tube and through the first hole 151 of the third baffle 119 into the second chamber 105. The oil and grease is expected to remain in the upper layers of the third sub-chamber 104, not flowing into through the second cylindrical tube T-structure 132 into the second chamber 105.

The same principle is repeated in the second chamber 105. The third cylindrical tube T-structure 133 extends towards the bottom of the grease trap 10 without reaching the floor 111. Water enters the third cylindrical tube T-structure 133 through the bottom and rises as water enters the second chamber 105. When the within the third cylindrical tube T-structure 133 reaches the level of the horizontal tube, the water flows through the horizontal tube and through the first hole 153 of the fourth baffle 120 into the third chamber 106. The oil and grease is expected to remain in the upper layers of the second chamber 105, not flowing into the third chamber 106.

The same principle is repeated a third time in the third chamber 106. The fourth cylindrical tube T-structure 134 extends towards the bottom of the grease trap 10 without reaching the floor 111. Water enters the fourth cylindrical tube T-structure 134 through the bottom and rises as water enters the third chamber 106. When the water within the fourth cylindrical tube T-structure 134 reaches the level of the horizontal tube, the water flows through the horizontal tube and through the outlet 107. Any remaining oil and grease is expected to remain in the upper layers of the third chamber 106, not flowing through the outlet 107. The water that exits through the outlet 107 is devoid of solid wastes, oil and grease.

While the invention has been described as having a preferred design, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. An apparatus for treating waste water comprising:
   a housing comprising a plurality of panels, wherein said plurality of panels form outer walls and a floor, wherein said outer walls comprise at least a first panel,
   a plurality of baffles comprising at least a first baffle, wherein said plurality of baffles are arranged inside said outer walls and on top of said floor to create at least a first chamber and a second chamber inside said outer walls and on top of said floor, wherein said first chamber comprises a first sub-chamber, wherein said first baffle is located at the first chamber,
   a plurality of fluid conducts comprising a first fluid conduct device, a second fluid conduct device and a third fluid conduct device, wherein said second fluid conduct device is attached to at least one of said plurality of baffles;
   wherein said first fluid conduct device from said plurality of fluid conducts is attached to said first panel;
   wherein said first fluid conduct device guides an outer waste water containing waste material into said first chamber and said second fluid conduct device is attached to a second panel from said plurality of panels guiding the outer waste water containing waste material from said first chamber into said second chamber;
   a turbulence buffer, wherein said turbulence buffer is attached to said first baffle creating an open space between said floor and said turbulence buffer, wherein said turbulence buffer extends perpendicular to said first baffle and on top of said first sub-chamber;
   wherein said first fluid conduct device extends towards the open space between said floor and said turbulence buffer; and
   wherein said turbulence buffer comprises movable sections, influent flow guides and fixing means, wherein said fixing means attach the movable sections to said first chamber avoiding unwanted movement.

2. An apparatus for treating waste water, as in claim 1 wherein said movable sections comprises a first movable section and a second movable section, wherein said first movable section is mechanically coupled to said first sub-chamber and said second movable section is mechanically coupled to said first movable section.

3. An apparatus for treating waste water, as in claim 1 wherein the movable sections and the influent flow guides assists to create a vortex inside the first sub-chamber for trapping residual of waste water, wherein said vortex is created between the turbulence buffer and said floor.

4. An apparatus for treating waste water, as in claim 1 wherein said turbulence buffer comprises several stoppers to control the displacement of said movable sections.

5. An apparatus for treating waste water, as in claim 1 wherein said turbulence buffer is removable.

\* \* \* \* \*